Feb. 23, 1971  SHIGEKATSU FUJII  3,564,749
FISHHOOK
Filed Nov. 12, 1968  3 Sheets-Sheet 1

INVENTOR.
SHIGEKATSU FUJII
BY McGlew and Toren
ATTORNEYS

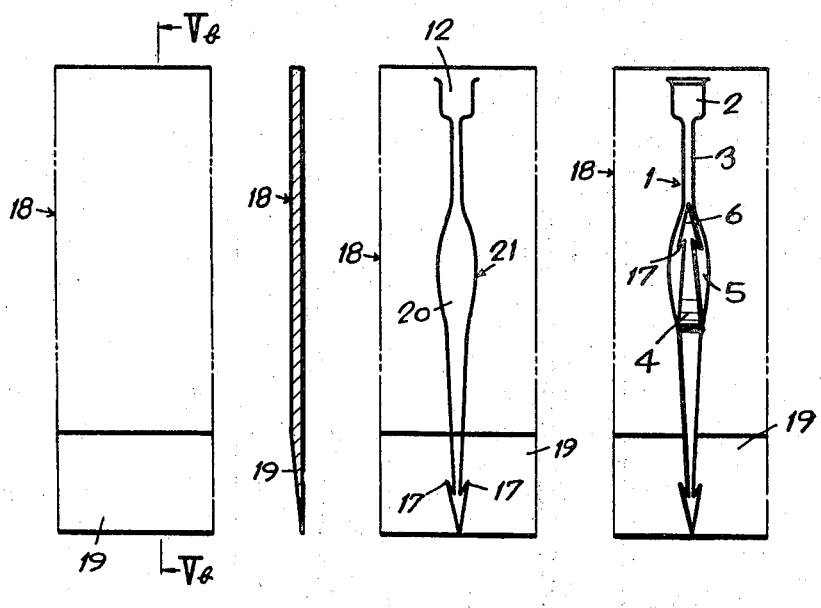
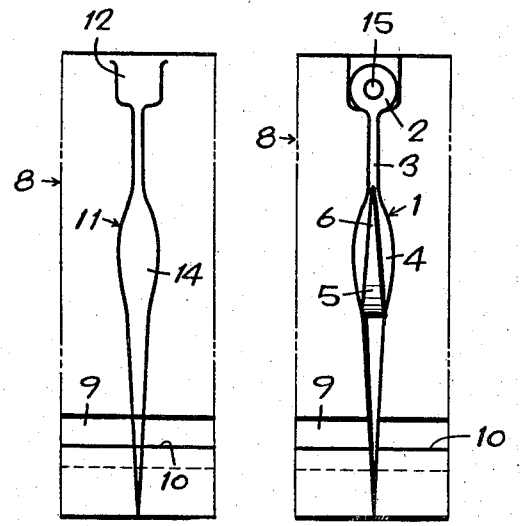

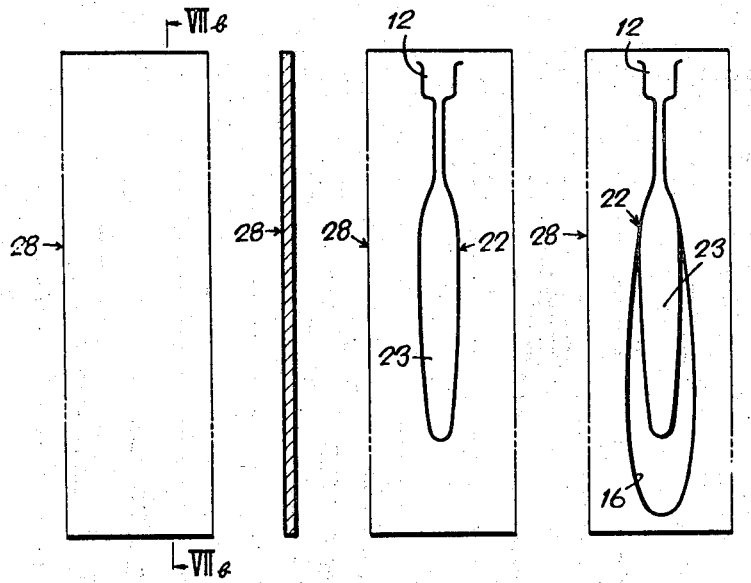
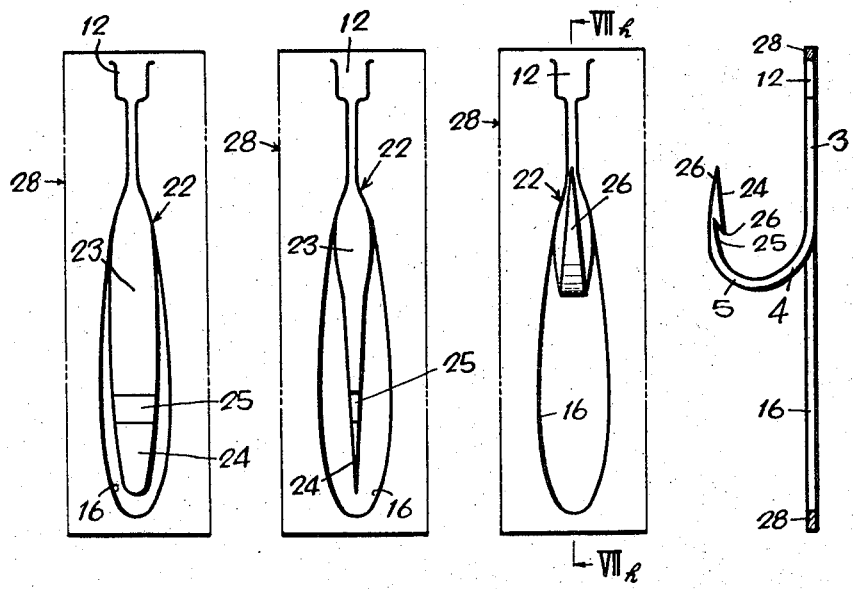

United States Patent Office 3,564,749
Patented Feb. 23, 1971

3,564,749
FISHHOOK
Shigekatsu Fujii, 281 Gamae, Nishiwaki,
Hyogo Prefecture, Japan
Filed Nov. 12, 1968, Ser. No. 774,678
Claims priority, application Japan, Nov. 16, 1967,
42/73,765
Int. Cl. A01k 83/00
U.S. Cl. 43—43.16          5 Claims

ABSTRACT OF THE DISCLOSURE

A fishhook comprising an uppermost portion, a stem portion, a first curved portion, a second curved portion, a sharply pointed tip and a downwardly directed pointed end contiguous with said sharply pointed tip.

Said uppermost portion and said first curved portion have a width larger than the width of said stem portion.

---

The present invention relates in general to fishhooks, and in particular the invention is concerned with a fishhook and a method of making same which hook is formed such that an uppermost portion and a first curved portion thereof have a sectional area larger than the sectional area of other portions so that said two portions may have a higher strength to withstand a high load applied thereto in operation.

Conventional fishhooks are generally made by forming a wire material into the shape of a letter J, an uppermost portion of a fishhook of the prior art generally being flattened by applying pressure thereto and a pointed end portion contiguous with a second curved portion being cut to provide a sharp pointed tip. It is known that when fish is hooked up the force exerted on the first curved portion and the uppermost portion of a fishhook is larger than the force exerted on the stem portion of the fishhook. However, since fishhooks of the prior art made by shaping a wire material as aforementioned are substantially uniform in thickness from the stem portion substantially to the second curved portion, such fishhooks are liable to be broken at the first curved portion in operation. An additional disadvantage of conventional fishhooks lies in the fact that their overall weight is substantial because the stem portion to which a relatively low load is applied has an unnecessarily large thickness. Those fishhooks which are perforated in the uppermost portion like tuna hooks, for example, have a disadvantage in that the strength of the perforated uppermost portion is markedly reduced because the opening is formed in the flattened uppermost portion having a reduced thickness.

Accordingly, an object of the present invention is to provide a novel and improved fishhook which obviates the disadvantages of conventional fishhooks as aforementioned.

Another object of the invention is to provide a fishhook high in strength and light in weight which is formed by stamping from a sheet material in such a manner that its uppermost portion and first curved portion have a sectional area larger than the sectional area of its stem portion.

Still another object of the invention is to provide a method of continuously making a fishhook high in strength and light in weight by stamping and bending from a sheet material at a high efficiency.

A further object of the invention is to provide a method of continuously making a fishhook high in strength and light in weight by providing a tapered portion by rolling or cutting in a sheet material, forming a pen-shaped block by stamping from said sheet material, said pen-shaped block having a pointed end provided by said tapered portion, and bending the pen-shaped block to provide a fishhook at a high efficiency.

A still further object of the invention is to provide a method of making a fishhook by forming a block shaped like a paddle with a flate blade by stamping from a sheet material while leaving said paddle-shaped block connected to said sheet material at the upper end of the sheet, forming a gap between a lower portion of said paddle-shaped block and the sheet material, rolling said lower portion of the paddle-shaped block, cutting rolled lower portion of the paddle-shaped block substantially into a triangle, bending same substantially into the shape of a letter J, and disconnecting the block shaped in the manner described from the sheet material at the upper end of the sheet, whereby an increased strength can be imparted to portions of the finished fishhook extending from the first curved portion to the pointed tip because of the rolling operation to which the block is subjected.

Additional objects and advantages of the fishhook embodying the present invention will become apparent after the description hereafter set forth is considered in conjunction with the accompanying drawings, in which:

FIGS. 5a, 5b, 5c and 5d show the process of making a fishhook by a second embodiment of the method according to this invention, FIG. 5b being a sectional view taken along the line Vb—Vb of FIG. 5a;

FIGS. 6a and 6b are plan views showing a modification of the first embodiment of the method according to this invention; and FIGS. 7a, 7b, 7c, 7d, 7e, 7f, 7g and 7h show the process of making a fishhook by a third embodiment of the method according to this invention, FIG. 7b being a sectional view taken along the line VIIb—VIIb of FIG. 7a and FIG. 7h being a sectional view taken along the line VIIh—VIIh of FIG. 7g.

Figure 2:
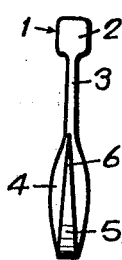
FIG. 2 is a front view of the fishhook of FIG. 1.
Figure 1:
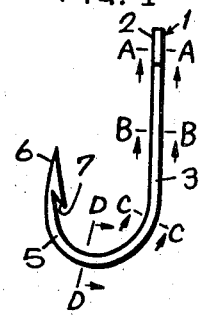
FIG. 1 is a side view of a fishhook embodying the present invention.
Figure 3A:
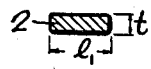
FIGS. 3a, 3b, 3c and 3d are enlarged sectional views taken along the lines A—A, B—B, C—C and D—D of FIG. 1.
Figure 3B:
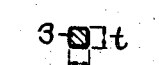
Figure 3C:
Figure 3D:
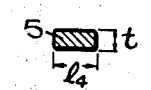

The invention will now be explained in detail with reference to the embodiments shown in the drawings. In FIGS. 1 and 2, a fishhook embodying the present invention is generally designated 1 and has an uppermost portion 2 and a first curved portion 4 disposed above and below and contiguous with a stem portion 3 respectively. The first curved portion is contiguous with a second curved portion 5 which has a sharp pointed tip 6 at its end. The sharp pointed tip 6 extends downwardly toward the second curved portion 5 to provide a downwardly directed pointed end 7.

A fishhook embodying the present invention is substantially similar to conventional fishhooks in the details of construction as aforementioned except for the facts that the various portions of the fishhook according to this invention are rectangular in section because the fishhook is made by stamping from a sheet steel for convenience of processing, and that the various portions of the fishhook according to the invention vary from one another in sectional area in accordance with varying forces exerted thereon when fish is hooked up so as to maintain a balance between loads applied to the various portions of the fishhook and strengths of various portions of the fishhook. More specifically, the fishhook 1 has a substantially uniform thickness $t$ but its width $l$ varies from its uppermost portion 2 to the middle of its first curved portion 4 so as to adjust the sectional area. That is, the uppermost portion 2 has a width $l_1$ which is larger than the width $l_2$ of the stem portion 3, and the width $l_3$ of the first curved portion 4 in the center thereof is larger than the width $l_1$ of the uppermost portion 2. Of the three portions in the upper part of the fishhook 1, the first curved portion 4 has the largest sectional area in its center and the stem portion 3 has the smallest sectional area as shown in FIGS. 3a to 3d.

As shown in FIG. 2, the first curved portion 4 which has the largest width substantially in its center gradually tapers in two directions from the center toward the stem portion 3 and the second curved portion 5. The thickness and width of the fishhook 1 are increasingly reduced in going from the second curved portion 5 to the pointed tip 6 so that the pointed tip can be made as sharp as possible. The sharp pointed tip 6 extends downwardly to provide the downwardly directed hook-shaped pointed end 7.

Figure 4A:
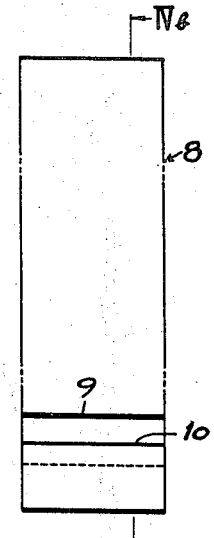
FIGS. 4a, 4b, 4c, 4d and 4e show the process of making a fishhook by one embodiment of the method according to this invention, FIG. 4b being a sectional view taken along the line IVb—IVb of FIG. 4a and FIG. 4e being a sectional view taken along the line IVe—IVe of FIG. 4d.
Figures 4B, 4C:
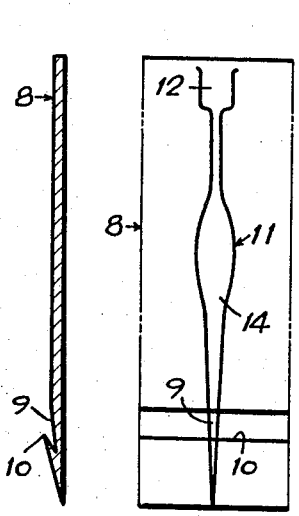

The method of making the fishhook 1 shaped and configured as described above will now be explained. One embodiment of the method embodying this invention is showns in FIGS. 4a to 4e which illustrate the process of making a fishhook according to this invention. A sheet material 8 is used for making the fishhook 1 since it is most convenient to do so for shaping the fishhook as aforementioned. The sheet material 8 may be of any material that best serves the purpose and suits the condition in preparing the fishhook 1. The sheet material 8 is rolled or cut to provide a tapered portion 9 in its lower portion as shown in FIGS. 4a and 4b so as to form therein the second curved portion 5 and the pointed tip 6 of the fishhook 1. The tapered portion 9 is formed substantially at its middle portion with a hook-like offset portion 10 disposed lengthwise of the sheet material 8 in preparation for forming the downwardly directed pointed end 7 of the fishhook 1.

A block 11 substantially in the form of a fishhook as it is developed is formed by stamping from the sheet material by means of a press, with the block 11 being connected at its T-shaped base 12 to the sheet material 8 at the upper end of the sheet transversely thereof as shown in FIG. 4c. The block 11 formed by stamping is substantially shaped like a pen and has a laterally expanded portion 14 above the tapered portion 9, the laterally expanded portion 14 corresponding to the first curved portion 4 of the finished fishhook 1. A portion contiguous with and extending upwardly from the laterally expanded portion 14 to the lower end of the base 12 corresponds to the stem portion 3 and a portion contiguous with and extending downwardly from the laterally expanded portion 14 to its end corresponds to the second curved portion 5 of the finished fishhook 1.

Figure 4D:
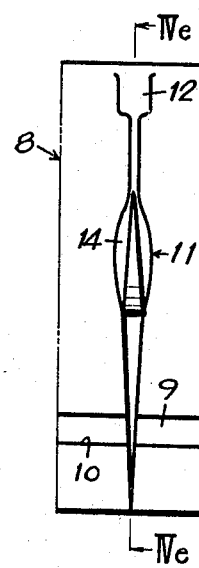
Figure 4E:
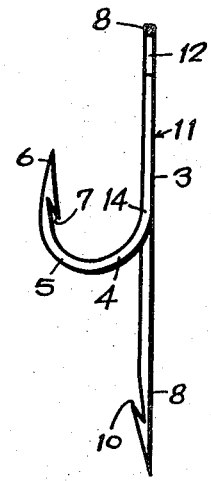

The angle portions of the block 11 may be chamfered by means of a shaping press as required, and then the portion extending downwardly from the laterally expanded portion 14 is bent substantially arcuately by means of a bending machine so as to form the block 11 substantially into the shape of a letter J as shown in FIGS. 4d and 4e. Thereafter, the block 11 is detached from the sheet material 8 at the base 12 to provide the fishhook 1 shaped and configured as shown in FIGS. 1 and 2.

It will be appreciated that, as shown in FIGS. 1 and 2, the fishhook 1 made in the process described above has a uniform thickness from the uppermost portion 2 to the first curved portion 4 through the stem portion 3. The width of the uppermost portion 2 is larger than that of the stem portion 3, while the center of the first curved portion 4 has a width larger than the width of the uppermost portion 2. The fishhook 1 has an increasingly reduced thickness and width in going from the first curved portion 4 to the pointed tip 6 through the second curved portion 5. Moreover, there is provided the hook-shaped downwardly directed pointed end 7 extending downwardly from the pointed tip 6.

FIGS. 5a to 5d show a second embodiment of the method according to this invention. The process of this embodiment is substantially similar to that shown in FIGS. 4c to 4e except for the fact that in forming a block 21 by stamping from a sheet material 18 in the form of a developed fishhook as shown in FIG. 5c after providing a tapered portion 19 alone in the lower portion of the sheet material 18, the lower end portion of the block 21 formed with a laterally expanded portion 20 is shaped like an anchor when the block 21 is formed by stamping and the block 21 is bent at a portion below the laterally expanded portion 20 so as to provide downwardly directed pointed ends 17, 17 extending from the pointed tip 6 of the fishhook 1.

FIGS. 6a and 6b show a modification of the first embodiment of the method according to this invention which is adapted for making a perforated fishhook. In this modification, the sheet material 8 formed with the offset portion extending downwardly from the solid line 10 in the lowered tapered portion 9 is used and the base 12 has a sufficiently large width for forming therein an opening as shown in FIG. 6a. The block 11 is formed by stamping in the shape of a pen and bent. In severing the bent block 11 from the sheet material 8 at the base 12 of the former, the base 12 is shaped annularly and at the same time an opening 15 is formed. The operations can be simplified when a fishhook having no downwardly directed pointed end is to be made because such a fishhook can be made by stamping and bending from the sheet material 18 formed with the tapered portion 9 alone.

In each embodiment of the method of making a fishhook described above, when a rolled strip is used as a sheet material for making the fishhook by stamping therefrom, the fishhook made can have a relatively high strength as a result of plastic deformation if stamping is effected in such a manner that the direction in which rolling is effected on the strip and the lengthwise direction of the block 11 formed by stamping will coincide with each other.

A third embodiment of the method according to this invention is similar to the second embodiment described above in that the fishhook 1 embodying the present invention can be made thereby, but the former differs from the latter in the configuration of a sheet material used and the operations through which a block obtained by stamping is processed following stamping. More specifically, a planar sheet is used as a sheet material 28 as shown in FIGS. 7a and 7b for forming a block 22 in the shape of a paddle with a flat blade by stamping therefrom, with the block 22 being left connected to the sheet material 28 at the base 12. Then, a gap 16 is formed between the block 22 and the sheet material 28 by removing the material of the sheet in the neighborhood of a laterally expanded portion 23 disposed below the center of the paddle-shaped block 22 and a portion contiguous with and disposed below the laterally expanded portion.

Only the portion disposed below and contiguous with the laterally expanded portion 23 of the block 22 is rolled so as to provide a tapered portion 25 between the laterally expanded portion 23 and the lower end of the paddle-shaped block 22, and an offset portion 24 is formed in the center of the tapered portion 25 in preparation for forming a downwardly directed pointed end 26 in the finished fishhook. Then, the lower part of the laterally expanded portion 23 of the paddle-shaped block 22 is cut to shape the same substantially into an isosceles triangle while leaving the upper part of the laterally expanded portion in its original form as shown in FIG. 7f, and the portion shaped like an isosceles triangle is bent arcuately so that the paddle-shaped block 22 may be shaped substantially like a letter J. Upon disconnecting the block 22 from the sheet material 28 at the base 12 of the former, the fishhook shown in FIG. 1 can be produced.

It should be noted that, though omitted in the drawings, a fishhook similar in shape and configuration to that shown in FIG. 5d can be produced if the portion disposed below and contiguous with the laterally expanded portion is rolled to provide a tapered portion and the tapered portion thus formed is cut to provide an anchor-shaped lower end instead of cutting the tapered portion into the shape of an isosceles triangle.

The material used in the present invention is a steel sheet 4.0 millimeters in thickness and made of a high carbon steel containing 0.1 to 0.45% carbon. In making a fishhook, the material is subjected to nodularizing at a temperature above 700° C. as usual. Then, as described with reference to FIG. 4a et sequa, stamping and bending operations and, particularly in the process shown in FIG. 7a et sequa, stamping, rolling and bending operations are performed. The material thus processed through various operations is heated to 1000 to 1200° C., quenched and tempered at about 400° C. Finally, finishing touches are given to the product by grinding the tip and otherwise treating the product as required to provide a finished fishhook.

The material used in various embodiments of the method of the invention may be a high carbon steel sheet containing 0.3% carbon and having a thickness of 1 millimeter, for example. The fishhook shaped as shown in FIGS. 1 and 2 from this material has the widths of $l_1=3$ millimeters, $l_2=1$ millimeters, $l_3=4.5$ millimeters and $l_4=1.8$ millimeters. The first curved portion of the fishhook dimensioned as above has a high strength.

From the foregoing description, it will be appreciated that a fishhook embodying the present invention has a very high strength and is never broken while in service because the fishhook is formed by stamping from a sheet material in such a manner that the uppermost portion and the first curved portion on which the largest force is exerted when fish are hooked, have larger widths than the stem portion so as to increase the dimensional area of these portions. In addition, the fishhook is light in weight and easy to handle because the dimensional area of the stem portion, to which a relatively small load is applied, is minimized.

In the first embodiment and the second embodiment of the method of making a fishhook according to the present invention, a sheet material is formed with a tapered portion at its lower portion by rolling or cutting and a block shaped like a pen is formed by stamping in such a manner that said tapered portion of the sheet material serves as a pointed end portion of the finished fishhook. Then the pen-shaped block is bent into a generally J-shaped fishhook. It will be appreciated that the bent portion of that the fishhook made as aforementioned has an increased strength because of the bending operation. In addition, the production can be carried out continuously at a high efficiency. The embodiments described are particularly adapted for making a variety of fishhooks varying in shape and configuration.

In the third embodiment of the method according to the invention, a planar sheet material is used and a block shaped like a paddle with a flat blade is formed by stamping from the planar sheet material while leaving the paddle-shaped block connected to the upper end of the sheet material at the base of the block. Then, the material of the sheet in the neighborhood of a portion of the paddle-shaped block below the center thereof is removed, the lower portion of the paddle-shaped block is rolled to provide a tapered portion therein, the rolled portion is cut substantially in the form of a isosceles triangle, the block is bent substantially in the form of a letter J, and then the block is disconnected from the sheet material at the base of the former so as to thereby produce a fishhook. The process described above makes it possible to produce a fishhook embodying the present invention as do the processes of the first and second embodiments previously described. At the same time, a part of the fishhook between the first curved portion and the pointed tip as made by the process described above has an increased strength because of the bending and rolling operations to which said part is subjected.

It is to be understood that while the invention has been described with reference to preferred embodiments thereof, various changes and modifications may be made in the specific details of the embodiments without departing from the spirit and scope of the invention.

I claim:

1. A fishhook made in one piece from flat sheet stock comprising, a fishhook body made up of interconnected portions extending from one end of said body to the opposite other end and including in order: an uppermost portion, a stem portion, a first curved portion, a second curved portion, and a sharp pointed tip at the end of the second curved portion, the cross-sectional area of at least a part of the first curved portion being greater than the cross-sectional area of the other portions and the width of said part of said first curved portion being greater than the width of the second curved portion and the uppermost portion, said second curved portion being wider than said stem portion.

2. A fishhook, as defined in claim 1, in which the cross-sectional area of the uppermost portion is greater than the cross-sectional area of the shem portion and the second curved portion.

3. A fishhook, as defined in claim 1, comprising a barb extending from the sharp pointed tip towards the second curved portion.

4. A fishhook, as defined in claim 3, comprising two laterally extending barbs adjacent the sharp pointed tip.

5. A fishhook, as defined in claim 1, in which the uppermost portion is pierced.

References Cited

UNITED STATES PATENTS

| 842,594 | 1/1907 | Van Vleck | 43—43.16 |
| 1,513,400 | 10/1924 | Koski | 43—43.16 |
| 2,164,807 | 7/1939 | Evans | 43—43.16 |
| 2,526,240 | 10/1950 | Labunde | 43—43.16 |
| 2,608,791 | 9/1952 | Wentz | 43—43.16X |
| 2,815,603 | 12/1957 | Bandemer | 43—43.16 |

FOREIGN PATENTS 975,570  10/1950  France.

ALDRICH F. MEDBERY, Primary Examiner

J. F. PITRELLI, Assistant Examiner

U.S. Cl. X.R.

D22—30